United States Patent
Rannoux et al.

(10) Patent No.: US 10,577,520 B2
(45) Date of Patent: *Mar. 3, 2020

(54) ASSEMBLY OF TIMEPIECE PARTS ASSEMBLED USING REPOSITIONABLE HOT MELT ADHESIVE AND PROCESS FOR ASSEMBLING AND REPOSITIONING SUCH PARTS

(71) Applicant: The Swatch Group Research and Development Ltd, Marin (CH)

(72) Inventors: Claire Rannoux, Lausanne (CH); Maria Fernandez Ciurleo, Fleurier (CH)

(73) Assignee: The Swatch Group Research and Development Ltd, Marin (CH)

( * ) Notice: Subject to any disclaimer, the term of this patent is extended or adjusted under 35 U.S.C. 154(b) by 27 days.

This patent is subject to a terminal disclaimer.

(21) Appl. No.: 15/371,436

(22) Filed: Dec. 7, 2016

(65) Prior Publication Data

US 2017/0174941 A1    Jun. 22, 2017

(30) Foreign Application Priority Data

Dec. 18, 2015  (EP) .................................. 15201235

(51) Int. Cl.
| | | |
|---|---|---|
| *C09J 5/04* | (2006.01) | |
| *C09J 201/02* | (2006.01) | |
| *C09J 153/00* | (2006.01) | |
| *C09J 5/00* | (2006.01) | |
| *C08F 293/00* | (2006.01) | |
| *C09J 201/00* | (2006.01) | |
| *C08F 220/06* | (2006.01) | |
| *G04B 15/14* | (2006.01) | |
| *B32B 7/12* | (2006.01) | |
| *C09J 5/06* | (2006.01) | |
| *G04B 37/22* | (2006.01) | |
| *C09J 155/04* | (2006.01) | |
| *G04B 29/02* | (2006.01) | |
| *G04B 29/04* | (2006.01) | |

(52) U.S. Cl.
CPC ................... *C09J 5/04* (2013.01); *B32B 7/12* (2013.01); *C08F 220/06* (2013.01); *C08F 293/00* (2013.01); *C09J 5/00* (2013.01); *C09J 5/06* (2013.01); *C09J 153/00* (2013.01); *C09J 155/04* (2013.01); *C09J 201/00* (2013.01); *C09J 201/02* (2013.01); *G04B 15/14* (2013.01); *G04B 29/027* (2013.01); *G04B 29/04* (2013.01); *G04B 37/22* (2013.01); *B32B 2255/26* (2013.01); *C09J 2201/61* (2013.01); *C09J 2203/10* (2013.01); *C09J 2433/00* (2013.01); *C09J 2453/00* (2013.01)

(58) Field of Classification Search
CPC .... C09J 155/04; C09J 201/02; C09J 2201/61; C09J 5/06; C09J 153/00; G04B 37/22; C08F 293/00
See application file for complete search history.

(56) References Cited

U.S. PATENT DOCUMENTS

| 8,734,939 | B2 * | 5/2014 | Herr ....................... C08G 18/10 |
| | | | 156/329 |
| 9,926,468 | B2 * | 3/2018 | Rannoux ................. B29C 35/02 |
| 2008/0002527 | A1 * | 1/2008 | Ishii ..................... G04G 9/0035 |
| | | | 368/239 |
| 2012/0309895 | A1 | 12/2012 | Schmidt et al. |
| 2012/0325402 | A1 | 12/2012 | Suwa et al. |

FOREIGN PATENT DOCUMENTS

WO    WO 2011/112447 A2    9/2011

OTHER PUBLICATIONS

Polymer Properties Database, http://polymerdatabase.com/polymer%20physics/Polymer%20Tg%20C.html (2015; retrieved Oct. 1, 2018).*
European Search Report dated Jun. 3, 2016 in European Application 15201235.7, filed on Dec. 18, 2015 (with English Translation of Categories of cited documents).
Jing Bai, et al. "Dynamic crosslinked poly(styrene-block-butadiene-block-styrene) via Diels-Alder chemistry: an ideal method to improve solvent resistance and mechanical properties without losing its thermal plastic behavior", RSC Advances, vol. 5, No. 56, 2015, 13 pages.

* cited by examiner

Primary Examiner — Kregg T Brooks
(74) Attorney, Agent, or Firm — Oblon, McClelland, Maier & Neustadt, L.L.P.

(57) ABSTRACT

An assembly of timepiece parts assembled together with an adhesive at a temperature $T_A$ and to be repositioned when the adhesive is at a temperature $T_C$. The adhesive includes a formulation, which at $T_C$ includes a mixture of polymer chains with pendant diene units X and coupling molecules including two dienophile end groups Y, wherein the X units and the Y groups are arranged to react with one another and to bond together with the Diels-Alder reaction at a temperature $T_{DA}$ and to regenerate with the retro-Diels-Alder reaction at a temperature $T_{RDA}$, at $T_A$ forms a three-dimensional network, in which the polymer chains are linked to one another by the coupling molecules with the Diels-Alder reaction, where $T_A < T_{RDA} \leq T_C$, where temperature $T_{DA}$ ranges between 0° C. and 100° C. and temperature $T_{RDA}$ ranges between 50° C. and 200° C., and $T_{DA}$ is strictly lower than $T_{RDA}$. A process for assembling and repositioning two timepiece parts with a repositionable hot melt adhesive to enable the timepiece parts to be repositioned when the adhesive is heated.

26 Claims, No Drawings

ASSEMBLY OF TIMEPIECE PARTS ASSEMBLED USING REPOSITIONABLE HOT MELT ADHESIVE AND PROCESS FOR ASSEMBLING AND REPOSITIONING SUCH PARTS

This application claims priority from European Patent application 15201235.7 of Dec. 18, 2015, the entire disclosure of which is hereby incorporated herein by reference.

FIELD OF THE INVENTION

The present invention relates to the field of mechanics and in particular to the field of clock-making and jewelry making. More specifically, it relates to an assembly of at least two timepiece parts assembled together by means of a repositionable hot melt adhesive to allow timepiece parts to be repositioned when said adhesive is heated. It also concerns a process for assembling and repositioning such timepiece parts.

BACKGROUND OF THE INVENTION

In the field of clock-making timepiece parts are assembled together by means of a glue or an adhesive. The gluing points must be formed by means of a repositionable hot melt adhesive to enable them to be reworked using heat in a manual operation and to allow the glued parts to be repositioned in an optimum manner either during assembly or during maintenance or repair of the parts as part of aftersales service. Moreover, this adhesive must also have resistance to chemical cleaning operations, in particular to withstand timepiece cleaning operations conducted during the aftersales service.

As an example, the ruby pallet stones are secured to the pallets by gluing, generally by means of a shellac. Shellac is a natural resin that is thermofusible, i.e. it has a honey-like consistency at temperatures higher than its melting temperature (Tf) and is solid below its melting temperature (Tf) or its glass transition temperature (Tg). Thus, shellac can be softened by an operator using heat so that the pallet-stones can be displaced a few microns on the pallets. However, like any hot melt compound, shellac is soluble in solvents. Parts assembled using shellac therefore have a poor resistance to timepiece cleaning operations.

Another example relates to the balance spring glued to its stud by means of thermosetting glues such as the resin Epikote™. Thermosetting glues have a good chemical resistance. However, they cannot be reworked using heat, and therefore parts assembled using thermosetting glues cannot be separated and repositioned if required.

SUMMARY OF THE INVENTION

The object of the invention in particular is to remedy the different disadvantages of the known glues used hitherto to assemble timepiece parts.

More precisely, an object of the invention is to provide an adhesive that allows formation of an assembly of timepiece parts that can be reworked using heat to allow said timepiece parts to be repositioned while still being suitably resistant to timepiece cleaning operations.

For this purpose, the present invention relates to an assembly of at least two timepiece parts that are assembled together by means of an adhesive when said adhesive is at a temperature $T_A$ and can be repositioned in relation to one another when said adhesive is heated to a temperature $T_C$.

According to the invention said adhesive comprises at least one formulation, which:
at temperature $T_C$ has the form of a mixture of polymer chains comprising at least pendant diene units X and of coupling molecules comprising at least two dienophile end groups Y, wherein said X units and said Y groups are arranged to be able to react with one another and to bond together by means of the Diels-Alder reaction at a temperature $T_{DA}$ and to be able to regenerate by means of the retro-Diels-Alder reaction at a temperature $T_{RDA}$,
at a temperature $T_A$ has the form of a three-dimensional network, in which the polymer chains are linked to one another by the coupling molecules by means of the Diels-Alder reaction,
where $T_A < T_{RDA} \leq T_C$
where temperature $T_{DA}$ ranges between 0° C. and 100° C., preferably between 25° C. and 70° C., and temperature $T_{RDA}$ ranges between 50° C. and 200° C., preferably between 80° C. and 150° C., and $T_{DA}$ is strictly lower than $T_{RDA}$.

The present invention also relates to a process for assembling and repositioning at least two timepiece parts by means of a repositionable hot melt adhesive, wherein said timepiece parts are held together in assembled position when said adhesive is at a temperature $T_A$ and can be repositioned in relation to one another when said adhesive is heated to a temperature $T_C$, comprising the steps of:
a) preparing a solution of an adhesive comprising at least one formulation having the form of a mixture of polymer chains comprising at least pendant diene units X and of coupling molecules comprising at least two dienophile end groups Y, wherein said X units and said Y groups are arranged to be able to react with one another and to bond together by means of the Diels-Alder reaction at a temperature $T_{DA}$ and to be able to regenerate by means of the retro-Diels-Alder reaction at a temperature $T_{RDA}$,
where $T_A < T_{RDA} \leq T_C$, wherein temperature $T_{DA}$ ranges between 0° C. and 100° C., preferably between 25° C. and 70° C., and temperature $T_{RDA}$ ranges between 50° C. and 200° C., preferably between 80° C. and 150° C., and $T_{DA}$ is strictly lower than $T_{RDA}$,
b) applying the solution of said adhesive to the timepiece parts
c) drying
d) placing the timepiece parts at a temperature higher than or equal to the temperature $T_{DA}$ and lower than $T_{RDA}$ to link the polymer chains to one another by means of the coupling molecules by the Diels-Alder reaction so that the adhesive is in the form of a three-dimensional network
e) heating the timepiece parts to the temperature $T_C$ to regenerate the mixture of polymer chains and of coupling molecules by means of the retro-Diels-Alder reaction
f) repositioning the timepiece parts
g) cooling the timepiece parts to a temperature higher than or equal to temperature $T_{DA}$ and lower than $T_{RDA}$ to link the polymer chains to one another again by means of the coupling molecules by the Diels-Alder reaction so that the adhesive is once again in the form of a three-dimensional network
h) if necessary, repeating steps e) to g) as many times as required to reposition the timepiece parts again.

The present invention also relates to a process for assembling and repositioning at least two timepiece parts by means of a repositionable hot melt adhesive, wherein said timepiece parts are held together in assembled position when said adhesive is at a temperature $T_A$ and can be repositioned in relation to one another when said adhesive is heated to a temperature $T_C$, comprising the steps of:

a) preparing a solution of an adhesive comprising at least one formulation having the form of a mixture of block copolymer chains comprising at least a first polymer block having a glass transition temperature Tg or a melting temperature Tf ranging between 40° C. and 200° C., and at least a second polymer block comprising at least pendant diene units X and having a glass transition temperature Tg or a melting temperature Tf lower than a temperature $T_{DA}$, and of coupling molecules comprising at least two dienophile end groups Y, wherein said X units and said Y groups are arranged to be able to react with one another and to bond together by means of the Diels-Alder reaction at the temperature $T_{DA}$ and to be able to regenerate by means of the retro-Diels-Alder reaction at a temperature $T_{RDA}$, where $T_A<T_{RDA}\leq T_C$, wherein temperature $T_{DA}$ ranges between 0° C. and 100° C., preferably between 25° C. and 70° C., and temperature $T_{RDA}$ ranges between 50° C. and 200° C., preferably between 80° C. and 150° C., and $T_{DA}$ is strictly lower than $T_{RDA}$, and temperature $T_C$ is higher than the glass transition temperature Tg or the melting temperature Tf of the first polymer block, b) applying the solution of said adhesive to the timepiece parts c) drying d) placing the timepiece parts at a temperature higher than or equal to the glass transition temperature Tg or the melting temperature Tf of the first polymer block to reposition the timepiece parts e) cooling to a temperature lower than or equal to the glass transition temperature Tg or the melting temperature Tf of the first polymer block, f) placing the timepiece parts at a temperature higher than or equal to temperature $T_{DA}$ and lower than $T_{RDA}$ to link the block copolymer chains to one another by means of the coupling molecules by the Diels-Alder reaction so that the adhesive is in the form of a three-dimensional network g) heating said timepiece parts to the temperature $T_C$ to regenerate the mixture of block copolymer chains and of coupling molecules by means of the retro-Diels-Alder reaction h) repositioning the timepiece parts i) duplicating steps e) to f)

j) if necessary, repeating steps g) to i) as many times as required to reposition the timepiece parts again.

The assembly obtained can then be hot worked to separate the timepiece parts and reposition them and is resistant to timepiece cleaning operations.

The present invention also relates to the use of a repositionable hot melt adhesive to hold together at least two timepiece parts in an assembled position when said adhesive is at a temperature $T_A$ and to reposition them in relation to one another when said adhesive is heated to a temperature $T_C$, wherein said adhesive comprises at least one formulation, which:

at temperature $T_C$ has the form of a mixture of polymer chains comprising at least pendant diene units X and of coupling molecules comprising at least two dienophile end groups Y, wherein said X units and said Y groups are arranged to be able to react with one another and to bond together by means of the Diels-Alder reaction at a temperature $T_{DA}$ and to be able to regenerate by means of the retro-Diels-Alder reaction at a temperature $T_{RDA}$, at a temperature $T_A$ has the form of a three-dimensional network, in which the polymer chains are linked to one another by the coupling molecules by means of the Diels-Alder reaction, where $T_A<T_{RDA}\leq T_C$ where temperature $T_{DA}$ ranges between 0° C. and 100° C., preferably between 25° C. and 70° C., and temperature $T_{RDA}$ ranges between 50° C. and 200° C., preferably between 80° C. and 150° C., and $T_{DA}$ is strictly lower than $T_{RDA}$.

The present invention also relates to a timepiece part comprising an assembly of two timepiece parts assembled together by means of a repositionable hot melt adhesive as defined above.

DETAILED DESCRIPTION OF THE INVENTION

The present invention relates to an assembly of at least two timepiece parts that are assembled together by means of an adhesive when said adhesive is at a temperature $T_A$ and are able to be repositioned in relation to one another when said adhesive is heated to a temperature $T_C$.

The timepiece parts can be any element used in a timepiece mechanism that needs to be assembled on another element by gluing and must be separable during an aftersales service, for example, to be repositioned in an optimum manner. An assembly of timepiece parts is, for example, a ruby pallet-stone/pallet assembly or balance spring/stud assembly or index/dial assembly.

According to the invention the adhesive used comprises at least one formulation, which:

at the temperature $T_C$ has the form of a mixture of polymer chains comprising at least pendant diene units X and of coupling molecules comprising at least two dienophile end groups Y, wherein said X units and said Y groups are arranged to be able to react with one another and to bond together by means of the Diels-Alder reaction at a temperature $T_{DA}$ and to be able to regenerate by means of the retro-Diels-Alder reaction at a temperature $T_{RDA}$, at a temperature $T_A$ has the form of a three-dimensional network, in which the polymer chains are linked to one another by the coupling molecules by means of the Diels-Alder reaction, where $T_A<T_{RDA}\leq T_C$ where temperature $T_{DA}$ ranges between 0° C. and 100° C., preferably between 25° C. and 70° C., and temperature $T_{RDA}$ ranges between 50° C. and 200° C., preferably between 80° C. and 150° C., and $T_{DA}$ is strictly lower than $T_{RDA}$.

Temperatures $T_{DA}$ of the Diels-Alder reaction and $T_{RDA}$ of the retro-Diels-Alder reaction are dependent on the X units of the polymer chain and on the coupling molecule. The latter are selected such that temperature $T_{DA}$ of the Diels-Alder reaction advantageously ranges between 0° C. and 100° C., and more preferred between 25° C. and 70° C., and temperature $T_{RDA}$ of the retro-Diels-Alder reaction ranges between 50° C. and 200° C., preferably between 80° C. and 150° C.

The pendant diene units X are preferably pendant units comprising at least one, preferably terminal, diene function X, and are selected from the group consisting of furan, cyclopentadiene and anthracene.

Thus, examples of monomers that are particularly suitable for forming a polymer chain comprising pendant diene units X are:

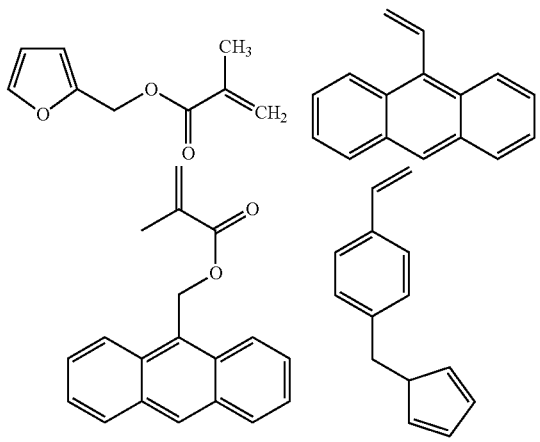

These molecules are commercially available or can be synthesised in one step (synthesis described in the publication Organic Letters, 4(14), 2365-2368; 2002), for example.

According to a first embodiment of the invention the polymer chain is a statistical copolymer obtained from different monomers that allow the desired properties to be obtained.

Advantageously, the polymer chain has a glass transition temperature Tg or a melting temperature Tf lower than $T_{DA}$, and preferably ranging between −50° C. and 80° C., and more preferred between −20° C. and 50° C.

Thus, the polymer chains are sufficiently mobile at the temperature $T_{DA}$ for the Diels-Alder reaction to easily occur between the polymer chain and the coupling molecules.

Advantageously, the polymer chain can, for example, comprise pendant units arranged to have an appropriate affinity with the timepiece parts. These pendant units are also stable at the temperature cycles that the timepiece parts will be subjected to.

The pendant units arranged to have an appropriate affinity with the timepiece parts are preferably selected from the group consisting of thiols, thioethers, thioesters, sulphides, thioamides, hydroxyls, catechol, amines, ammoniums, nitrogenated heterocycles such as imidazole or pyridine, carboxylic acids, esters and anhydrides.

Thus, particularly suitable examples of monomers for introducing pendant units arranged to have an appropriate affinity with the timepiece parts into the polymer chain already comprising pendant units X are:

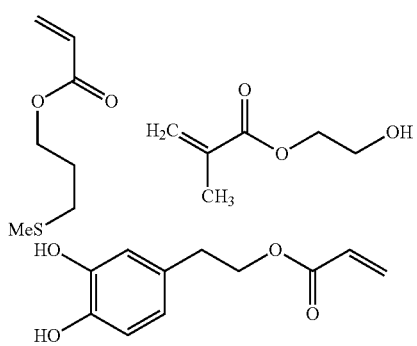

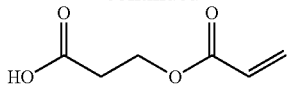

These molecules are commercially available.

Advantageously, the polymer chain can also comprise pendant units arranged to adjust the glass transition temperature Tg or melting temperature Tf of the polymer chain to below $T_{DA}$.

The pendant units arranged to adjust the glass transition temperature Tg or melting temperature Tf of the polymer chain are preferably selected from the group consisting of the possibly functionalised alkyl chains and phenyl derivatives. Thus, examples of suitable commercially available monomers for forming the pendant units arranged to adjust the Tg or Tf of the polymer are methacrylic or acrylic esters, styrene derivatives. The following may be given as example: butyl methacrylate (homo-butyl methacrylate=20° C.), cyclohexyl acrylate (homo-cyclohexyl acrylate=19° C.), tert-butyl methacrylate (Tg homo-tert-butyl methacrylate=118° C.), dodecyl methacrylate (Tf homo dodecyl methacrylate=−65° C.), 2-ethoxyethyl acrylate (Tg homo 2-ethoxyethyl acrylate=−50° C.), ethyl acrylate (Tg homo ethyl acrylate=−24° C.), hexyl acrylate (Tg hexyl acrylate=59° C.), styrene (Tg styrene homopolymer=100° C.).

It will also readily be understood that some of the pendant units arranged to provide a suitable affinity with the timepiece parts can also serve to adjust the Tg or Tf of the polymer chain.

Advantageously, the copolymer chain contains between 1 and 50%, preferably between 1 and 30% pendant units X, between 1 and 50%, preferably between 1 and 30% pendant units arranged to provide a suitable affinity with the timepiece parts, and between 1 and 90%, preferably between 20 and 70% pendant units arranged to adjust the glass transition temperature Tg or the melting temperature Tf of the chain.

The techniques of statistical polymerisation are well known to the person skilled in the art and do not need to be described in detail. A particularly suitable method of polymerisation is free radical copolymerisation, in solution or emulsion.

As regards the coupling molecules, their dienophile groups Y are preferably derivatives of compounds selected from the group consisting of maleimide and maleic anhydride.

Y is preferably a derivative of maleimide.

Thus the coupling molecule can advantageously have a structure of formula (I) below:

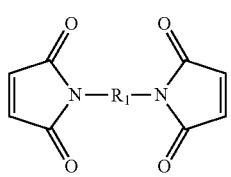

where R1 is an alkyl chain, preferably a $(CH_2)_n$ chain with $1 \le n \le 35$ substituted or not by at least one hydroxy group or by an N-methyl maleimide group, an aryl chain, preferably a phenyl, or a PDMS (polydimethylsiloxane) chain or a structure of the form

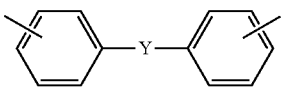

where Y=—O—, —S—, —CH$_2$—, —C(CH$_3$)$_2$— or a PDMS chain or a PEG (polyethylene glycol) chain.

Examples of particularly suitable coupling molecules that are commercially available are:

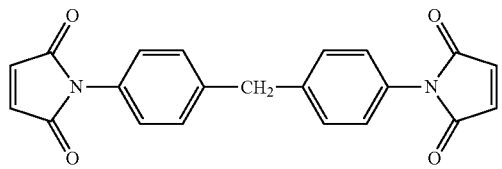

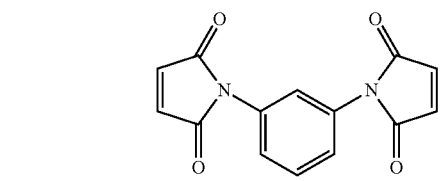

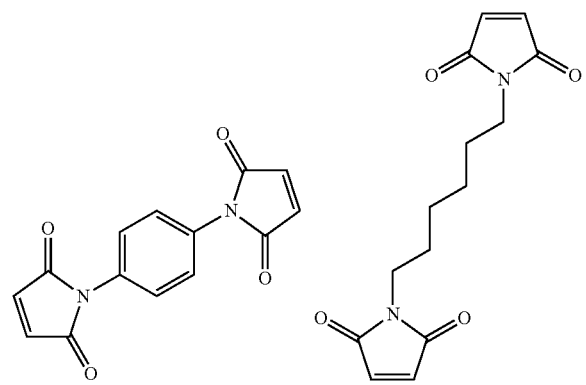

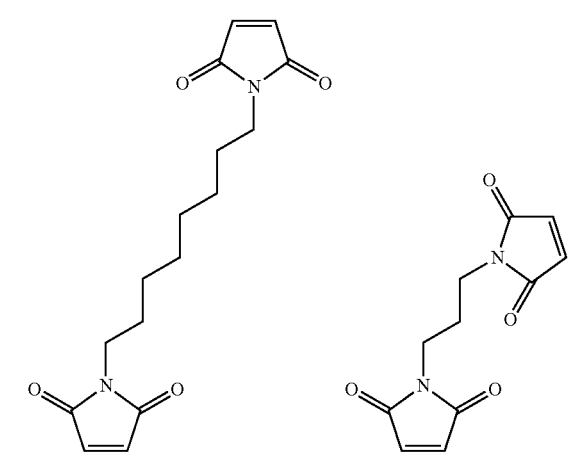

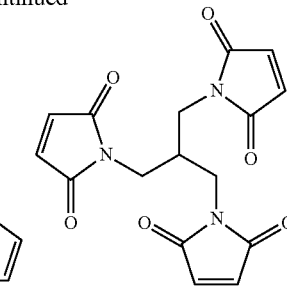

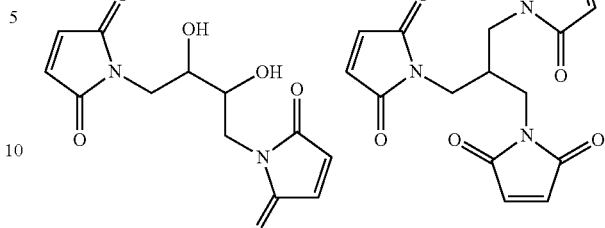

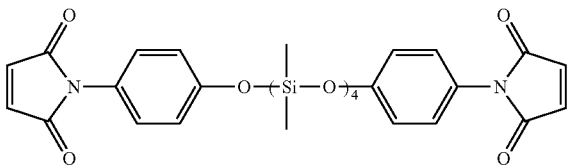

In the formulation provided in the form of a mixture of polymer chains comprising at least pendant diene units X and of coupling molecules comprising at least two dienophile end groups Y, the quantity of coupling molecules is such that the ratio of the number of coupling molecules to the number of pendant diene functions X ranges between 0.5:2 and 1.2:2 and preferably is equal to 1:2.

The two timepiece parts are assembled and can be repositioned using the assembly and repositioning process comprising the steps of:

a) preparing in a solvent (such as isopropyl alcohol, ethanol, methyl tert-butyl ether, tetrahydrofuran) a solution of an adhesive comprising at least one formulation having the form of a mixture of polymer chains comprising at least pendant diene units X and of coupling molecules comprising at least two coupling molecules comprising at least two dienophile end groups Y, wherein said X units and said Y groups are arranged to be able to react with one another and to bond together by means of the Diels-Alder reaction at a temperature $T_{DA}$ and to be able to regenerate by means of the retro-Diels-Alder reaction at a temperature $T_{RDA}$, where $T_A < T_{RDA} \leq T_C$, wherein temperature $T_{DA}$ ranges between 0° C. and 100° C., preferably between 25° C. and 70° C., and temperature $T_{RDA}$ ranges between 50° C. and 200° C., preferably between 80° C. and 150° C., and $T_{DA}$ is strictly lower than $T_{RDA}$, b) applying the solution of said adhesive to the timepiece parts to be assembled c) drying in vacuum to eliminate the solvent d) placing the timepiece parts at a temperature higher than or equal to the temperature $T_{DA}$ and lower than $T_{RDA}$ to link the polymer chains to one another by means of the coupling molecules by the Diels-Alder reaction so that the adhesive is in the form of a three-dimensional network e) if it is necessary to reposition the timepiece parts, heating said timepiece parts to the temperature $T_C$ to regenerate the mixture of polymer chains and of coupling molecules by means of the retro-Diels-Alder reaction f) repositioning the timepiece parts g) cooling the timepiece parts to a temperature higher than or equal to temperature $T_{DA}$ and lower than $T_{RDA}$ to link the polymer chains to one another again by means of the coupling molecules by the Diels-Alder reaction so that the adhesive is once again in the form of a three-dimensional network h) if necessary, repeating steps e) to g) as many times as required to reposition the timepiece parts again.

Thus, at ambient temperature in the normal conditions of use of the timepiece parts, the latter are glued by means of the adhesive that is resistant to timepiece cleaning operations because of the three-dimensional network formed by the polymer chains. At higher temperature, i.e. at least at the temperature $T_{RDA}$ of the retro-Diels-Alder reaction, the bridges formed between the polymer chains by the coupling molecules break in order to break the three-dimensional network. The viscosity of the adhesive decreases such that it is then possible to meticulously reposition the parts. The assembly is cooled and placed at a temperature that allows to trigger the Diels-Alder reaction between the polymer chains and the coupling molecules in order to reform the three-dimensional network and immobilise the parts in their new position.

According to a second embodiment of the invention the polymer chain is a block copolymer comprising at least a first polymer block having a glass transition temperature Tg or a melting temperature Tf ranging between 40° C. and 200° C., preferably between 60° C. and 150° C., and at least a second polymer block comprising at least pendant diene units X and having a glass transition temperature Tg or a melting temperature Tf lower than $T_{DA}$, and preferably ranging between −50° C. and 60° C., and more preferred between −50° C. and 20° C.

According to a third embodiment of the invention the polymer chain is a block copolymer comprising at each of its ends a polymer block having a glass transition temperature Tg or a melting temperature Tf ranging between 40° C. and 200° C., preferably between 60° C. and 150° C., and a central polymer block comprising at least pendant diene units X and having a glass transition temperature Tg or a melting temperature Tf lower than $T_{DA}$, and preferably ranging between −50° C. and 60° C., and more preferred between −50° C. and 20° C.

According to these second and third embodiments the polymer chain comprises at least one "hard" block formed by the polymer block having a glass transition temperature Tg or a melting temperature Tf ranging between 40° C. and 200° C., preferably between 60° C. and 150° C., and a "soft" block formed by the polymer block comprising at least pendant diene units X and having a glass transition temperature Tg or a melting temperature Tf lower than $T_{DA}$, and preferably ranging between −50° C. and 60° C., and more preferred between −50° C. and 20° C.

This soft block/hard block structure, in which the blocks each have their own glass transition temperature or melting temperature, advantageously enables the adhesive to have two properties: quick repositioning/immobilisation and resistance to cleaning operations.

In fact, the hard block (with higher Tg or Tf) ensures that the adhesive solidifies at ambient temperature (≤25° C.) and assures a fine and quick repositioning of the timepiece parts at a temperature higher than the glass transition temperature Tg or the melting temperature Tf of the hard block. The hard block plays the same role as a hot melt adhesive.

The soft blocks (with lower Tg or Tf) coupled by the coupling molecules enable a thermoreversible three-dimensional network to be created between the block copolymers and thus ensure resistance to timepiece cleaning operations. As described above, the three-dimensional network is formed by placing for some hours the assembly that has been repositioned and immobilised by the hard block at a temperature necessary for conducting the Diels-Alder reaction between the soft blocks and the coupling molecules. The low Tg or Tf of this soft block that is lower than $T_{DA}$ allows a high mobility of the chains and thus assures the coupling by means of the Diels-Alder reaction.

Advantageously, the "hard" polymer block with a glass transition temperature Tg or a melting temperature Tf ranging between 40° C. and 200° C., preferably between 60° C. and 150° C., is a homopolymer or copolymer formed from acrylic, methacrylic, acrylamide, styrene methacrylamide or vinyl monomers. Examples of monomers that are particularly suitable to obtain a block with a glass transition temperature or a melting temperature Tf ranging between 60° C. and 150° C. are tert-butyl methacrylate, isobutyl methacrylate, ethyl methacrylate, isobornyl acrylate, isobornyl methacrylate, phenyl methacrylate, N-isopropylacrylamide, isopropyl methacrylate, methacrylic acid, methacrylic anhydride, methacrylonitrile, methyl acrylate, methyl methacrylate, phenyl methacrylate, styrene, 3-methylstyrene, 4-methylstyrene, vinyl alcohol, vinyl benzoate, vinyl cyclohexanoate.

In the "soft" polymer block the pendant diene units X are the same as those defined above.

The "soft" polymer block can advantageously be a copolymer obtained from different monomers that allow the desired properties to be obtained.

Thus, the "soft" polymer block can comprise pendant units arranged to have an appropriate affinity with the timepiece parts. These pendant units are the same as those defined above for the statistical copolymer.

Moreover, the "soft" polymer block can comprise pendant units arranged to adjust the glass transition temperature Tg or melting temperature Tf of said "soft" polymer block to below the $T_{DA}$. These units are the same as those defined above for the statistical copolymer.

Techniques of block copolymerisation are well known to the person skilled in the art and do not need to be described in detail.

Two synthesis routes can preferably be used to obtain the block copolymer. A first possible route is the sequential synthesis of the blocks. This route can comprise the following steps, for example:

anionic styrene polymerisation to obtain the hard polymer block chain end functionalisation of the styrene to obtain a macroinitiator atom-transfer radical polymerisation (ATRP) of furfuryl methacrylate/butyl methacrylate/hydroxyethyl methacrylate to obtain a soft polymer block from the macroinitiator (=functional polystyrene)

or also:

controlled radical polymerisation of furfuryl methacrylate/butyl methacrylate/hydroxyethyl methacrylate from a bifunctional initiator (e.g. PhCOCHCl$_2$) to obtain the bifunctional soft block growth of styrene blocks from the macroinitiator (=bifunctional soft block) by controlled radical polymerisation.

A second possible route is synthesis by "click chemistry" between the two hard and soft blocks. This route can comprise the following steps, for example:

synthesis by ATRP of an alkyne-functional copolymer of furfuryl methacrylate/hydroxyethyl methacrylate/butyl methacrylate click chemistry coupling of the alkyne-functional copolymer of furfuryl methacrylate/hydroxyethyl methacrylate/butyl methacrylate with the commercially available azide-functional polystyrene shown below:

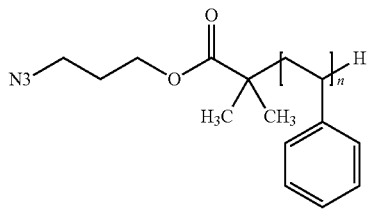

An example of block copolymer comprising a hard block and a soft block is shown below:

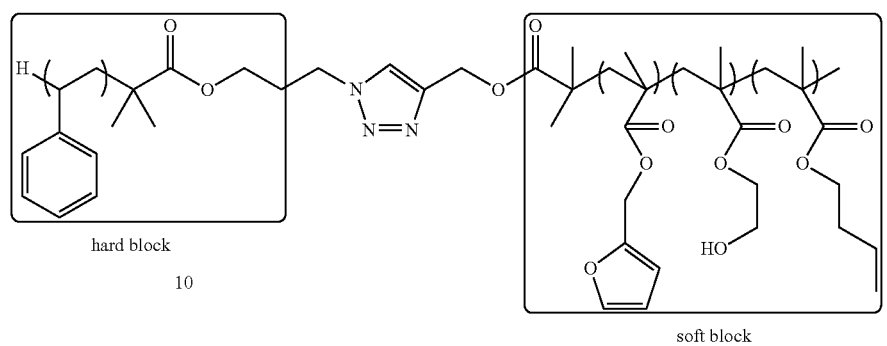

The two timepiece parts are assembled and can be repositioned using the assembly and repositioning process comprising the steps of:
  a) preparing in a solvent (such as isopropyl alcohol, ethanol, methyl tert-butyl ether, tetrahydrofuran) a solution of an adhesive comprising at least one formulation having the form of a mixture of block copolymer chains comprising at least a first polymer block having a glass transition temperature Tg or a melting temperature Tf ranging between 40° C. and 200° C., and at least a second polymer block comprising at least pendant diene units X and having a glass transition temperature Tg or a melting temperature Tf lower than a temperature $T_{DA}$, and of coupling molecules comprising at least two dienophile end groups Y, wherein said X units and said Y groups are arranged to be able to react with one another and to bond together by means of the Diels-Alder reaction at a temperature $T_{DA}$ and to be able to regenerate by means of the retro-Diels-Alder reaction at a temperature $T_{RDA}$,
    where $T_A < T_{RDA} \leq T_C$, wherein temperature $T_{DA}$ ranges between 0° C. and 100° C., preferably between 25° C. and 70° C., and temperature $T_{RDA}$ ranges between 50° C. and 200° C., preferably between 80° C. and 150° C., and $T_{DA}$ is strictly lower than $T_{RDA}$, and temperature $T_C$ is higher than the glass transition temperature Tg or the melting temperature Tf of the first polymer block,
  b) applying the solution of said adhesive to the timepiece parts to be assembled
  c) drying, e.g. in vacuum to eliminate the solvent
  d) placing the timepiece parts at a temperature higher than or equal to the glass transition temperature Tg or the melting temperature Tf of the first polymer block to finely reposition the timepiece parts
  e) cooling to a temperature lower than or equal to the glass transition temperature Tg or the melting temperature Tf of the first polymer block in order to immobilise the glued assembly
  f) placing, e.g. by placing in an oven, for some hours the timepiece parts at a temperature higher than or equal to temperature $T_{DA}$ and lower than $T_{RDA}$ to link the block copolymer chains to one another by means of the coupling molecules by the Diels-Alder reaction so that the adhesive is in the form of a three-dimensional network
  g) if it is necessary to reposition the timepiece parts, heating said timepiece parts to the temperature $T_C$ to regenerate the mixture of block copolymer chains and of coupling molecules by means of the retro-Diels-Alder reaction
  h) repositioning the timepiece parts
  i) duplicating steps e) to f)
  j) if necessary, repeating steps g) to i) as many times as required to reposition the timepiece parts again.

The advantage of a block structure is that the assembly of timepiece parts can be repositioned using heat and quickly immobilised by cooling the hard blocks while retaining the flexibility of the soft blocks so that they have sufficient mobility to be able to react by the Diels-Alder reaction with the coupling molecules at a temperature lower than the glass transition temperature of the melting temperature Tf of the hard blocks.

EXAMPLES OF SYNTHESIS OF POLYMER CHAINS

Example 1

The polymer chain is synthesised in the form of a statistical copolymer by free radical polymerisation of the following:
  a) furfuryl methacrylate
  b) 2-carboxyethyl acrylate
  c) hydroxyethyl acrylate
  d) dodecyl methacrylate
using the following operating method:
furfuryl methacrylate (1.06 mL, 6.9 mmol), 2-carboxyethyl acrylate (0.41 mL, 3.5 mmol),
hydroxyethyl acrylate (0.39 mL, 3.5 mmol), dodecyl methacrylate (2.70 mL, 9.2 mmol) are placed in a Schlenk flask containing toluene (3 mL) that has previously been degassed with nitrogen. The reaction medium is bubbled with nitrogen for 5 min. 0.5 mL of a 0.228 mol/L solution of azobisisobutyronitrile (AIBN) is added. The reaction medium is agitated and heated to 80° C. for 24 h. The polymer is coagulated in cold methanol and obtained in the form of a gel (yield=75%).

The following statistical copolymer is obtained:

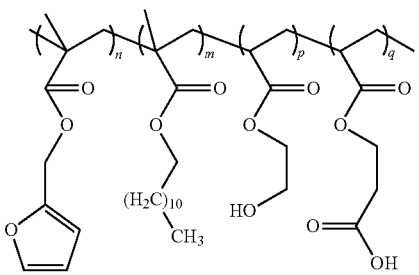

To form the repositionable hot melt adhesive the polymer chain described above is placed in solution in toluene, then mixed with the coupling agent 4,4'-(methylene di-p-phenylene)dimaleimide (3.4 mmol, 1.2 g).

This solution is then deposited onto the timepiece parts to be assembled according to the protocol described above.

Example 2

The polymer chain is synthesised in the form of an A-B-A block copolymer using the following operating method: furfuryl methacrylate (3 mL, 19.2 mmol), hydroxyethyl methacrylate (1.6 mL, 12.8 mmol), dodecyl methacrylate (5.6 mL, 19.2 mmol), catalyst Ru(Ind)Cl/PPh3)2 (10 mg), a solution of the bifunctional initiator CHCl2(COPh) (0.32 mL of a 400 mmol/L solution in toluene) and a solution of n-Bu3N in toluene (0.64 mL of a 0.27 mmol/L solution) are placed in a Schlenk flask containing toluene (6 mL) that has previously been degassed with nitrogen. The reaction medium is bubbled with nitrogen for 5 min, then agitated and heated to 80° C. for 24 h. The reaction medium is precipitated in acetone. The precipitate is separated by centrifuging, solubilised in toluene, then coagulated in methanol. The polymer is vacuum dried, then used as macroinitiator for the following step. For this, a solution of the macroinitiator polymer in toluene (2 mM) is prepared. Then, the 2M polymer macroinitiator solution (7.1 mL, 0.0142 mmol), catalyst Ru(Ind)Cl/PPh3)2 (10 mg) and methyl methacrylate (0.76 mL, 7.1 mmol) are placed into a Schenk flask. The mixture is heated and agitated for 24 h at 80° C. The reaction medium is precipitated in acetone. The precipitate is separated by centrifuging, solubilised in toluene, then coagulated in methanol. The polymer is vacuum dried, then used as macroinitiator for the following step.

The following block copolymer is obtained:

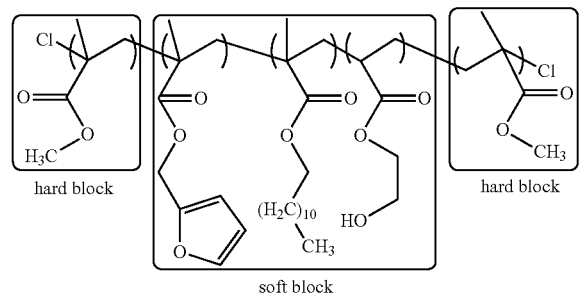

To form the repositionable hot melt adhesive the previously described polymer chain is placed in solution in toluene, then mixed with coupling agent 4,4'-(methylene di-p-phenylene)dimaleimide (134 mg, 0.375 mmol).

This solution is then deposited onto the timepiece parts to be assembled according to the protocol described above.

What is claimed is:

1. An assembly of at least two timepiece parts that are assembled together with an adhesive when said adhesive is at a temperature TA and can be repositioned in relation to one another when said adhesive is heated to a temperature TC, wherein said adhesive comprises at least one formulation, which:
   at the temperature TC forms a mixture of polymer chains comprising at least pendant diene units X and of coupling molecules comprising at least two dienophile end groups Y, wherein said X units and said Y groups are arranged to be able to react with one another and to bond together with the Diels-Alder reaction at a temperature TDA and to be able to regenerate with the retro-Diels-Alder reaction at a temperature TRDA,
   at a temperature TA forms a three-dimensional network, in which the polymer chains are linked to one another by the coupling molecules with the Diels-Alder reaction,
   where TA<TRDA≤TC
   where temperature TDA ranges between 0° C. and 100° C., and temperature TRDA ranges between 50° C. and 200° C., and TDA is strictly lower than TRDA,
   wherein the polymer chains comprise at least one block copolymer comprising at least a first polymer block having a glass transition temperature Tg or a melting temperature Tf ranging between 40° C. and 200° C., and at least a second polymer block comprising at least pendant diene units X and having a glass transition temperature Tg or a melting temperature Tf lower than TDA.

2. The assembly according to claim 1, wherein temperature TDA ranges between 25° C. and 70° C.

3. The assembly according claim 1, wherein temperature TRDA ranges between 80° C. and 150° C.

4. The assembly according to claim 1, wherein the polymer chain comprises pendant units arranged to have affinity with the timepiece parts.

5. The assembly according to claim 4, wherein the pendant units arranged to have affinity with the timepiece parts are selected from the group consisting of thiols, thioethers, thioesters, sulphides, thioamides, hydroxyls, catechol, amines, ammoniums, nitrogenated heterocycles, carboxylic acids, esters and anhydrides.

6. The assembly according to claim 1, wherein the polymer chain comprises pendant units arranged to adjust the glass transition temperature Tg or melting temperature Tf of the polymer chain.

7. The assembly according to claim 6, wherein the pendant units arranged to adjust the glass transition temperature Tg or melting temperature Tf of the polymer chain are selected from the group consisting of possibly functionalised alkyl chains and phenyl derivatives.

8. The assembly according to claim 1, wherein the first polymer block has a glass transition temperature Tg or a melting temperature Tf ranging between 60° C. and 150° C.

9. The assembly according to claim 1, wherein the second polymer block comprising at least pendant diene units X has a glass transition temperature Tg or a melting temperature Tf ranging between −50° C. and 60° C.

10. The assembly according to claim 1, wherein the polymer chain is a block copolymer comprising at each of its ends a polymer block having a glass transition temperature Tg or a melting temperature Tf ranging between 40° C. and 200° C., and a central polymer block comprising at least pendant diene units X and having a glass transition temperature Tg or a melting temperature Tf lower than TDA.

11. The assembly according to claim 10, wherein the polymer block at the ends of the block copolymer has a glass transition temperature Tg or a melting temperature Tf ranging between 60° C. and 150° C.

12. The assembly according to claim 10, wherein the central polymer block comprising at least pendant diene units X has a glass transition temperature Tg or a melting temperature Tf ranging between −50° C. and 60° C.

13. The assembly according to claim 1, wherein the polymer block having a glass transition temperature Tg or a melting temperature Tf ranging between 40° C. and 200° C. is selected from the group consisting of poly(tert-butyl methacrylate), poly(4-tert-butyl styrene), poly(cyclohexyl methacrylate), polystyrene and poly(methyl methacrylate).

14. The assembly according to claim 1, wherein the second polymer block comprises pendant units arranged to have affinity with the timepiece parts.

15. The assembly according to claim 14, wherein the pendant units arranged to have affinity with the timepiece parts are selected from the group consisting of thiols, thioethers, thioesters, sulphides, thioamides, hydroxyls, catechol, amines, ammoniums, nitrogenated heterocycles, carboxylic acids, esters and anhydrides.

16. The assembly according to claim 1, wherein the second polymer block comprises pendant units arranged to adjust the glass transition temperature Tg or melting temperature Tf of said second polymer block.

17. The assembly according to claim 16, wherein the pendant units arranged to adjust the glass transition temperature Tg or melting temperature Tf of the second polymer block are selected from the group consisting of possibly functionalised alkyl chains and phenyl derivatives.

18. The assembly according to claim 1, wherein the pendant diene units X are selected from the group consisting of furan, cyclopentadiene and anthracene.

19. The assembly according to claim 1, wherein the dienophile groups Y are derivatives of compounds selected from the group consisting of maleimide and maleic anhydride.

20. A timepiece part comprising an assembly of two timepiece parts assembled together with a repositionable hot melt adhesive according to claim 1.

21. A process for assembling and repositioning at least two timepiece parts with a repositionable hot melt adhesive to assemble the assembly according to claim 1, wherein said timepiece parts are held together in assembled position when said adhesive is at a temperature TA and can be repositioned in relation to one another when said adhesive is heated to a temperature TC, comprising the steps of:
  a) preparing a solution of an adhesive comprising at least one formulation having the form of a mixture of polymer chains comprising at least pendant diene units X and of coupling molecules comprising at least two dienophile end groups Y, wherein said X units and said Y groups are arranged to be able to react with one another and to bond together with the Diels-Alder reaction at a temperature TDA and to be able to regenerate with the retro-Diels-Alder reaction at a temperature TRDA,
  where TA<TRDA≤TC, wherein temperature TDA ranges between 0° C. and 100° C., and temperature TRDA ranges between 50° C. and 200° C., and TDA is strictly lower than TRDA, wherein the polymer chains comprise at least one block copolymer comprising at least a first polymer block having a glass transition temperature Tg or a melting temperature Tf ranging between 40° C. and 200° C., and at least a second polymer block comprising at least pendant diene units X and having a glass transition temperature Tg or a melting temperature Tf lower than TDA,
  b) applying the solution of said adhesive to the timepiece parts
  c) drying
  d) placing the timepiece parts at a temperature higher than or equal to the temperature TDA and lower than TRDA to link the polymer chains to one another with the coupling molecules by the Diels-Alder reaction so that the adhesive is in the form of a three-dimensional network
  e) heating the timepiece parts to the temperature TC to regenerate the mixture of polymer chains and coupling molecules with the retro-Diels-Alder reaction
  f) repositioning the timepiece parts
  g) cooling the timepiece parts to a temperature higher than or equal to temperature TDA and lower than TRDA to link the polymer chains to one another again with the coupling molecules by the Diels-Alder reaction so that the adhesive is once again in the form of a three-dimensional network
  h) if necessary, repeating steps e) to g) as many times as required to reposition the timepiece parts again.

22. The process according to claim 21, wherein temperature TDA ranges between 25° C. and 70° C.

23. The process according to claim 21, wherein temperature TRDA ranges between 80° C. and 150° C.

24. A process for assembling and repositioning at least two timepiece parts with a repositionable hot melt adhesive, wherein said timepiece parts are held together in assembled position when said adhesive is at a temperature TA and can be repositioned in relation to one another when said adhesive is heated to a temperature TC, comprising the steps of:
  a) preparing a solution of an adhesive comprising at least one formulation having the form of a mixture of block copolymer chains comprising at least a first polymer block having a glass transition temperature Tg or a melting temperature Tf ranging between 40° C. and 200° C., and at least a second polymer block comprising at least pendant diene units X and having a glass transition temperature Tg or a melting temperature Tf lower than a temperature TDA, and of coupling molecules comprising at least two dienophile end groups Y, wherein said X units and said Y groups are arranged to be able to react with one another and to bond together with the Diels-Alder reaction at a temperature TDA and to be able to regenerate with the retro-Diels-Alder reaction at a temperature TRDA,
  where TA<TRDA≤TC, wherein temperature TDA ranges between 0° C. and 100° C., and temperature TRDA ranges between 50° C. and 200° C., and TDA is strictly lower than TRDA, and temperature TC is higher than the glass transition temperature Tg or the melting temperature Tf of the first polymer block, b) applying the solution of said adhesive to the timepiece parts
c) drying
d) placing the timepiece parts at a temperature higher than or equal to the glass transition temperature Tg or the melting temperature Tf of the first polymer block to reposition the timepiece parts
e) cooling to a temperature lower than or equal to the glass transition temperature Tg or the melting temperature Tf of the first polymer block,
f) placing the timepiece parts at a temperature higher than or equal to temperature TDA and lower than TRDA to link the block copolymer chains to one another with the coupling molecules by the Diels-Alder reaction so that the adhesive is in the form of a three-dimensional network
g) heating said timepiece parts to the temperature TC to regenerate the mixture of block copolymer chains and of coupling molecules with the retro-Diels-Alder reaction
h) repositioning the timepiece parts
i) duplicating steps e) to f)
j) if necessary, repeating steps g) to i) as many times as required to reposition the timepiece parts again.

25. The process according to claim 24, wherein temperature TDA ranges between 25° C. and 70° C.

26. The process according to claim 24, wherein temperature TRDA ranges between 80° C. and 150° C.

* * * * *